United States Patent
Asam

(10) Patent No.: US 11,831,148 B2
(45) Date of Patent: Nov. 28, 2023

(54) UNDERVOLTAGE PROTECTION AND CONTROL CIRCUIT FOR ELECTRONIC SWITCHES

(71) Applicant: Infineon Technologies AG, Neubiberg (DE)

(72) Inventor: Michael Asam, Inchenhofen-Sainbach (DE)

(73) Assignee: Infineon Technologies AG, Neubiberg (DE)

( * ) Notice: Subject to any disclaimer, the term of this patent is extended or adjusted under 35 U.S.C. 154(b) by 212 days.

(21) Appl. No.: 17/465,528

(22) Filed: Sep. 2, 2021

(65) Prior Publication Data

US 2022/0077674 A1 Mar. 10, 2022

(30) Foreign Application Priority Data

Sep. 4, 2020 (DE) .......................... 102020123149.0

(51) Int. Cl.
*H02H 3/247* (2006.01)
*H02H 3/06* (2006.01)

(52) U.S. Cl.
CPC ............ *H02H 3/247* (2013.01); *H02H 3/066* (2013.01)

(58) Field of Classification Search
CPC .................. H02H 3/247; H02H 3/066; H02M 3/155–1588
See application file for complete search history.

(56) References Cited

U.S. PATENT DOCUMENTS

| | | | |
|---|---|---|---|
| 5,517,379 A | 5/1996 | Williams et al. | |
| 5,719,509 A | 2/1998 | Chan | |
| 5,862,390 A | 1/1999 | Ranjan | |
| 5,877,647 A | 3/1999 | Vajapey et al. | |
| 6,060,792 A | 5/2000 | Pelly | |

(Continued)

FOREIGN PATENT DOCUMENTS

| | | |
|---|---|---|
| DE | 102004063946 A1 | 3/2006 |
| DE | 102016100498 A1 | 7/2016 |

(Continued)

OTHER PUBLICATIONS

Machine Translation of JP-2004023846-A. (Year: 2004).*

(Continued)

*Primary Examiner* — Peter M Novak
(74) *Attorney, Agent, or Firm* — Shumaker & Sieffert, P.A.

(57) ABSTRACT

A method for operating an electronic switch is described hereinafter. According to one exemplary embodiment, the method (for an electronic switch in the switched on state) comprises detecting whether there is an undervoltage condition at a supply voltage node and providing an undervoltage signal which indicates an undervoltage condition. The method further comprises switching off the electronic switch if the undervoltage signal indicates an undervoltage condition and switching (back) on the electronic switch if the undervoltage signal no longer indicates an undervoltage condition. If the undervoltage signal indicates an undervoltage condition during a switch-on process of the electronic switch, the electronic switch is switched off again and switching back on is prevented for a defined period of time, irrespective of the undervoltage signal. Moreover, a corresponding circuit is described.

12 Claims, 5 Drawing Sheets

(56) References Cited

U.S. PATENT DOCUMENTS

| | | | |
|---|---|---|---|
| 6,144,085 A | 11/2000 | Barker | |
| 6,166,502 A | 12/2000 | Pattok et al. | |
| 6,924,669 B2 | 8/2005 | Itoh et al. | |
| 7,279,765 B2 | 10/2007 | Ahn et al. | |
| 7,489,855 B2 | 2/2009 | Kraus | |
| 8,018,245 B2 | 9/2011 | Sohn | |
| 8,155,916 B2 | 4/2012 | Baginski et al. | |
| 9,293,907 B2 | 3/2016 | Ueta et al. | |
| 9,413,352 B2 | 8/2016 | Lim | |
| 9,672,201 B1 | 6/2017 | Uszkoreit et al. | |
| 9,705,394 B2 | 7/2017 | Ohshima | |
| 9,887,532 B2 | 2/2018 | Djelassi et al. | |
| 9,954,548 B2 | 4/2018 | Illing et al. | |
| 10,170,905 B2 | 1/2019 | Illing et al. | |
| 10,305,363 B1 | 5/2019 | Chen et al. | |
| 10,868,418 B2 | 12/2020 | Djelassi-Tscheck et al. | |
| 10,897,247 B2 | 1/2021 | Marques Martins et al. | |
| 10,972,088 B1 | 4/2021 | Barrenscheen et al. | |
| 11,018,664 B2 | 5/2021 | Bernardoni et al. | |
| 11,177,644 B2 | 11/2021 | Mayer et al. | |
| 2002/0024376 A1 | 2/2002 | Sander | |
| 2003/0001533 A1 | 1/2003 | Kleinau et al. | |
| 2005/0007711 A1* | 1/2005 | Liu | H02H 3/202 361/90 |
| 2005/0184715 A1 | 8/2005 | Kidokoro et al. | |
| 2005/0270869 A1 | 12/2005 | Krischke et al. | |
| 2006/0016891 A1* | 1/2006 | Giebel | G06K 7/10851 235/462.25 |
| 2007/0008744 A1 | 1/2007 | Heo et al. | |
| 2007/0194009 A1 | 8/2007 | Seger | |
| 2010/0103705 A1* | 4/2010 | Fang | H02M 3/33507 363/21.18 |
| 2012/0194119 A1 | 8/2012 | Kroeze et al. | |
| 2013/0082627 A1 | 4/2013 | Ichikawa et al. | |
| 2013/0301175 A1 | 11/2013 | Posat | |
| 2014/0078629 A1 | 3/2014 | Cortigiani et al. | |
| 2014/0091384 A1 | 4/2014 | Petruzzi et al. | |
| 2014/0167827 A1* | 6/2014 | Hernandez-Distancia | H03K 6/04 327/170 |
| 2015/0226787 A1 | 8/2015 | Mankel et al. | |
| 2015/0285843 A1 | 10/2015 | Michal | |
| 2015/0381152 A1 | 12/2015 | Choi et al. | |
| 2017/0063077 A1 | 3/2017 | Donath et al. | |
| 2017/0063367 A1 | 3/2017 | Tsurumaru | |
| 2017/0294772 A1 | 10/2017 | Illing et al. | |
| 2017/0294918 A1 | 10/2017 | Illing et al. | |
| 2017/0294922 A1 | 10/2017 | Illing et al. | |
| 2017/0338737 A1 | 11/2017 | Kohama | |
| 2017/0358512 A1 | 12/2017 | Kakimoto | |
| 2017/0366116 A1 | 12/2017 | Ogawa et al. | |
| 2018/0048140 A1 | 2/2018 | Takuma et al. | |
| 2018/0102774 A1 | 4/2018 | Leong et al. | |
| 2018/0138904 A1 | 5/2018 | Nagase | |
| 2018/0219543 A1 | 8/2018 | Komo et al. | |
| 2018/0248351 A1 | 8/2018 | Vail et al. | |
| 2018/0287365 A1 | 10/2018 | Djelassi-Tscheck et al. | |
| 2019/0043969 A1 | 2/2019 | Wood | |
| 2019/0131863 A1 | 5/2019 | El Markhi et al. | |
| 2019/0204889 A1 | 7/2019 | Kaeriyama et al. | |
| 2019/0356161 A1 | 11/2019 | Wakazono et al. | |
| 2020/0021207 A1 | 1/2020 | Donat et al. | |
| 2020/0132725 A1 | 4/2020 | Krummenacher et al. | |
| 2021/0028780 A1 | 1/2021 | Mayer et al. | |
| 2021/0028781 A1 | 1/2021 | Mayer et al. | |
| 2021/0050718 A1 | 2/2021 | Djelassi-tscheck et al. | |
| 2021/0050848 A1 | 2/2021 | Bernardoni et al. | |
| 2021/0050850 A1 | 2/2021 | Djelassi-tscheck et al. | |

FOREIGN PATENT DOCUMENTS

| | | | |
|---|---|---|---|
| DE | 102015144460 A1 | 3/2017 | |
| DE | 102017107520 A1 | 11/2017 | |
| DE | 102017107523 A1 | 11/2017 | |
| DE | 102017106896 A1 | 10/2018 | |
| GB | 2549934 A | 11/2017 | |
| JP | 2004023846 A * | 1/2004 | ............. H02M 1/38 |
| KR | 20150141404 A | 12/2015 | |
| KR | 101807300 B1 | 12/2017 | |
| WO | 0169784 A1 | 9/2001 | |

OTHER PUBLICATIONS

Infineon Technologies AG, "BTN8962TA High Current PN Half Bridge NovalithIC™," Data Sheet, Rev. 1.0, May 17, 2013, 26 pp.

Jain et al., "Analysis and Design of Digital IIR Integrators and Differentiators Using Minimax and Pole, Zero, and Constant Optimization Methods," accepted May 2013, 15 pp.

Oppeheim et al., "Discrete-Time Signal Processing," Sec. 6.3, Second Edition, ISBN 0-13-754920.2, 1999, 5 pp. (Applicant points out, in accordance with MPEP 609.04(a), that the year of publication, 1999, is sufficiently earlier than the effective U.S. filing date, so that the particular month of publication is not in issue.).

U.S. Appl. No. 17/009,718, filed Sep. 1, 2020, naming inventors Barrenscheen et al.

International Standard ISO 7637-2, Third Edition, Mar. 1, 2011, entitled "Road vehicles-Electrical disturbances from conduction and coupling-Part 2: Electrical transient conduction along supply lines only," 48 pp.

International Standard ISO 26262-1, Second Edition, Dec. 2018, entitled "Road vehicles-Functional safety-Part 1: Vocabulary," 42 pp.

* cited by examiner

UNDERVOLTAGE PROTECTION AND CONTROL CIRCUIT FOR ELECTRONIC SWITCHES

This application claims priority to German Application Number 102020123149.0 filed on Sep. 4, 2020, the entire content of which is incorporated herein by reference.

TECHNICAL FIELD

The present description relates to a control circuit for an electronic switch which can be used in so called smart power switches, for example, as well as to a corresponding method for controlling an electronic switch.

BACKGROUND

Electromechanical components such as relays and safety fuses, for example, are increasingly being replaced by electronic switches. In particular, this applies to automotive applications. Modern concepts make provision for supplying electrical loads via decentralized load distribution nodes (power distribution nodes), for example, rather than bringing together all lines centrally in a distribution box in which the fuses are conventionally also located.

Electronic switches usually comprise a switch element, such as, for example, a transistor (MOSFET, IGBT, BJT or the like) and a control circuit (driver circuit). The control circuit is usually constructed in such a way that the switch element disconnects the connection between on-board power supply and load if the supply voltage is too low (undervoltage shutdown). This serves the self-protection of the electronic switch and also serves to protect the on-board power supply. Various standards (in the automotive sector LV124, for example, a test standard of German automotive manufacturers since 2013) make provision for the fact that an electronic switch must be switched on again after an undervoltage shutdown, after the supply voltage has risen to a normal value again. There are also tests in which the behavior of electronic switches and electronic control units (ECUs) is tested in the case of very short interruptions in the supply voltage (so called "micro cuts").

An undervoltage can have different causes. On the one hand, problems on the supply side (such as, for example, a weak battery, insufficient electrical contacts, etc.) can result in an undervoltage, on the other hand, a short circuit or an overload on the load side can also result in an undervoltage. A short circuit in the load usually results in a drop in the supply voltage at the supply pin of the electronic switch, via which the load is supplied. In a situation of this type, the control circuit of the electronic switch identifies an undervoltage and switches off the switch element, whereby the load is disconnected from the onboard power supply. As a result, the current flow through the (short circuited) load is interrupted and the supply voltage will rise to a normal value again, whereupon the electronic switch switches on again and an undervoltage occurs once again. The result of this is a toggling with high power dissipation in the switch element. In order to avoid the electronic switch overheating, conventional control circuits are usually constructed in such a way that the control circuit waits a specific delay time (e.g. 5 mins) before switching back on is attempted. This gives the switch sufficient time to cool down.

The aforementioned solution (delay before switching back on) is suitable for controlling simple loads but not for applications in the main power distribution system of a motor vehicle, in the case of which not one individual load but rather a subsystem or a group of subsystems with a multiplicity of loads is supplied via an electronic switch. In applications of this type, it is desirable for the electronic switch to be reactivated without significant delay (i.e. within a few microseconds) after a shutdown as a result of undervoltage, provided that the undervoltage was not caused by a short circuit. One underlying object of the invention can therefore be seen in improving and making more flexible the control circuit in electronic switches and corresponding methods.

SUMMARY

The aforementioned object is achieved by way of the method according to Claim 1 as well as the circuit according to Claim 9. Various exemplary embodiments and developments are the subject matter of the dependent claims.

A method for operating an electronic switch is described hereinafter. According to one exemplary embodiment, the method (for an electronic switch in the switched on state) comprises detecting whether there is an undervoltage condition at a supply voltage node and providing an undervoltage signal which indicates an undervoltage condition. The method further comprises switching off the electronic switch if the undervoltage signal indicates an undervoltage condition and switching (back) on the electronic switch if the undervoltage signal no longer indicates an undervoltage condition. If the undervoltage signal indicates an undervoltage condition during a switch-on process of the electronic switch, the electronic switch is switched off again and switching back on is prevented for a defined period of time, irrespective of the undervoltage signal.

Moreover, a corresponding circuit is described which is designed to carry out the above mentioned method.

BRIEF DESCRIPTION OF THE ILLUSTRATIONS

Various exemplary embodiments are explained in greater detail hereinafter using the examples represented in the illustrations. The representations are not necessarily to scale and the invention is not merely limited to the aspects represented. In fact, emphasis is placed on representing the underlying principles of the exemplary embodiments represented. In the illustrations:

DETAILED DESCRIPTION

Figure 1:
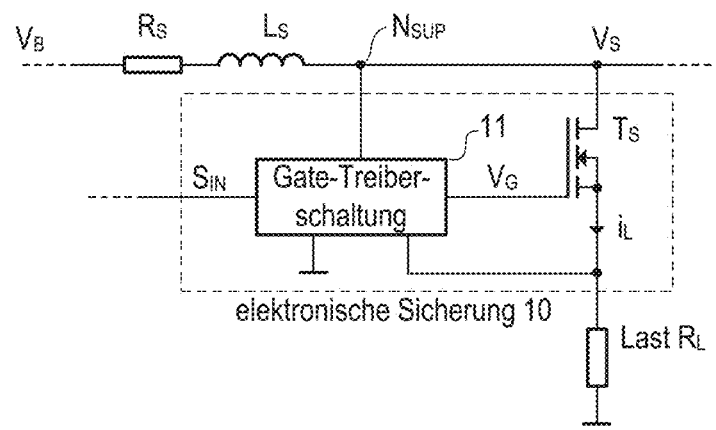
FIG. 1 illustrates an "intelligent semiconductor switch" with a control circuit and a MOSFET as a switch element.

FIG. 1 illustrates one example of an "intelligent" electronic switch 10 which can be used as a kind of electronic fuse, for example. Accordingly, the circuit from FIG. 1 comprises a transistor $T_S$ as a switch element which—in accordance with a control signal $V_G$—can produce an electrically conductive connection between a load $R_L$ and a supply voltage node $N_{SUP}$. In the example represented, the load $R_L$ is connected between the switch element and ground. The electronic switch 10 is therefore a high-side switch. However, the concepts described herein can also be applied to low-side switches. In the example represented, the transistor $T_S$ is configured as an MOS transistor (MOSFET). Other types of transistors are also possible. In the case of an MOS transistor, the aforementioned control signal $V_G$ is a gate voltage which is supplied to the control electrode (gate) of the transistor $T_S$.

The control signal $V_G$ is generated by the driver circuit 11 depending on an input signal $S_{IN}$, wherein the function of the driver circuit 11 shall be explained in greater detail later on. The driver circuit 11 is also connected to the supply voltage node $N_{SUP}$ and a ground node GND.

The supply voltage node $N_{SUP}$ is connected to a voltage source, for example a vehicle battery, via a line. In the example, this line is symbolized by the inductance Ls and the resistance $R_S$. In this case, inductance Ls and resistance $R_S$ do not refer to independent components but rather are parasitic properties of the line. In the present example, the source voltage $V_B$ (battery voltage) is assumed to be 13.8V. The supply voltage $V_S$ which is available at the supply voltage node $N_{SUP}$ can deviate from the source voltage $V_B$. This is the case in particular with high load currents $i_L$ and fast current changes $di_L/dt$.

The driver circuit 11 is designed to detect an undervoltage condition which is defined by the fact that the supply voltage $V_S$ falls below a specific threshold value $V_{UV}$ (i.e. $V_S < V_{UV}$), and to switch off the transistor $T_S$ in response to an undervoltage condition, provided that an undervoltage condition is present. If an undervoltage condition is no longer detected, the transistor (if applicable after an additional delay time) is switched on again. It is understood that in the case of a detected undervoltage condition, the transistor $T_S$ is switched off irrespective of the level of the input signal $S_{IN}$. The input signal $S_{IN}$ is a logic signal which only indicates the nominal condition of the transistor $T_S$ (switched on or switched off). The actual condition can deviate from the nominal condition "switched on" depending on other influencing factors (among other things as a result of detecting an undervoltage condition). If the input signal $S_{IN}$ indicates that the transistor $T_S$ should be switched off, the driver circuit 11 will always switch off the transistor $T_S$ or prevent the transistor $T_S$ from being switched on. For further discussion, it is assumed that the input signal $S_{IN}$ signals a switched on condition of the transistor.

Figure 2:
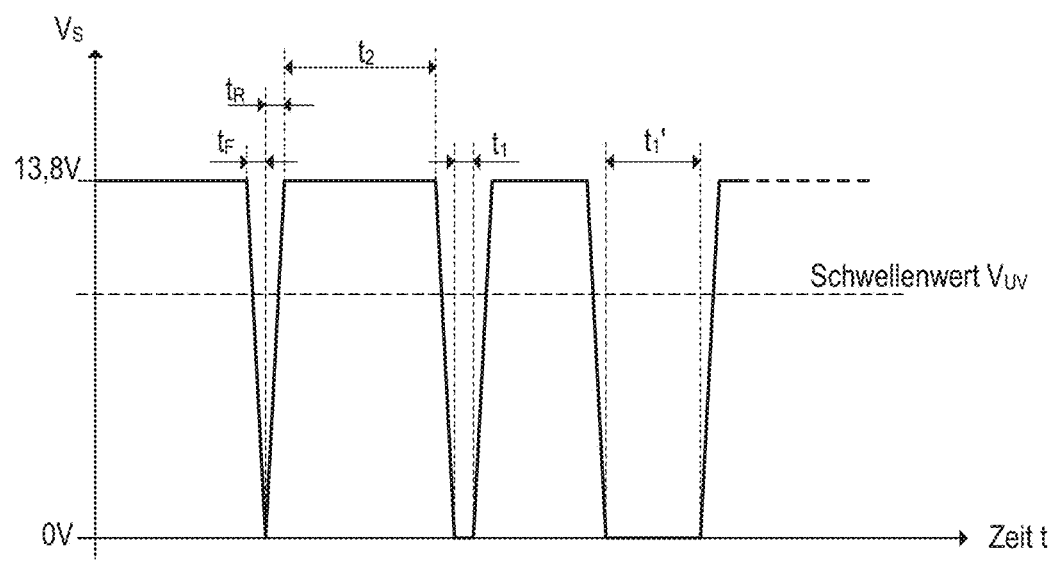
FIG. 2 is a timing diagram for illustrating short interruptions in the supply voltage (micro cuts).

As mentioned at the outset, an undervoltage condition can have different causes. For example, problems on the supply side (such as, for example, a weak battery, loose connections, etc.) can result in a supply voltage which is too low ("too low" in this case means $V_S < V_{UV}$). Moreover, a short circuit or an overload on the load side can also result in an undervoltage condition. There are standardized test which check the behavior of electronic switches with regard to undervoltage conditions. One example of a test sample is represented in FIG. 2. FIG. 2 shows the signal course of the supply voltage $V_S$ using a timing diagram. The short interruptions in the supply voltage $V_S$ are also referred to as "micro cuts".

In FIG. 2, the duration of the first interruption is merely $t_F+t_R$ ($t_F$ and $t_R$ refer to fall time or rise time), the duration of the second interruption is $t_F+t_1+t_R$, wherein $t_1$ is in the range of fall time or rise time, and the duration of the third interruption is $t_F+t_i+t_R$, wherein ti is significantly longer than ti. The first two interruptions could be referred to as micro cuts. Each of these interruptions results in an undervoltage condition being detected, with the consequence being that the transistor $T_S$ is (temporarily) switched off (despite the fact that the input signal $S_{IN}$ indicates the transistor switching on).

As mentioned at the outset, switching off as a result of detecting an undervoltage condition (undervoltage shutdown) results in a toggling (continuously switching the transistor off and on again), provided that the cause of the undervoltage condition is a short circuit on the load side or an overload. After the undervoltage shutdown, the supply voltage $V_S$ will rise above the threshold value $V_{UV}$ again (since a load current no longer flows), which causes the driver circuit 11 to switch on the transistor again. After the transistor $T_S$ is switched on again, the short circuit or the overload will immediately result in an undervoltage condition again, and the next cycle begins. As mentioned, driver circuits are usually constructed in such a way that after an undervoltage shutdown, a delay time $t_{DEL}$ of a few milliseconds is waited before switching on again, in order to limit the frequency of the toggling and to prevent overheating of the electronic switch.

Figure 3:
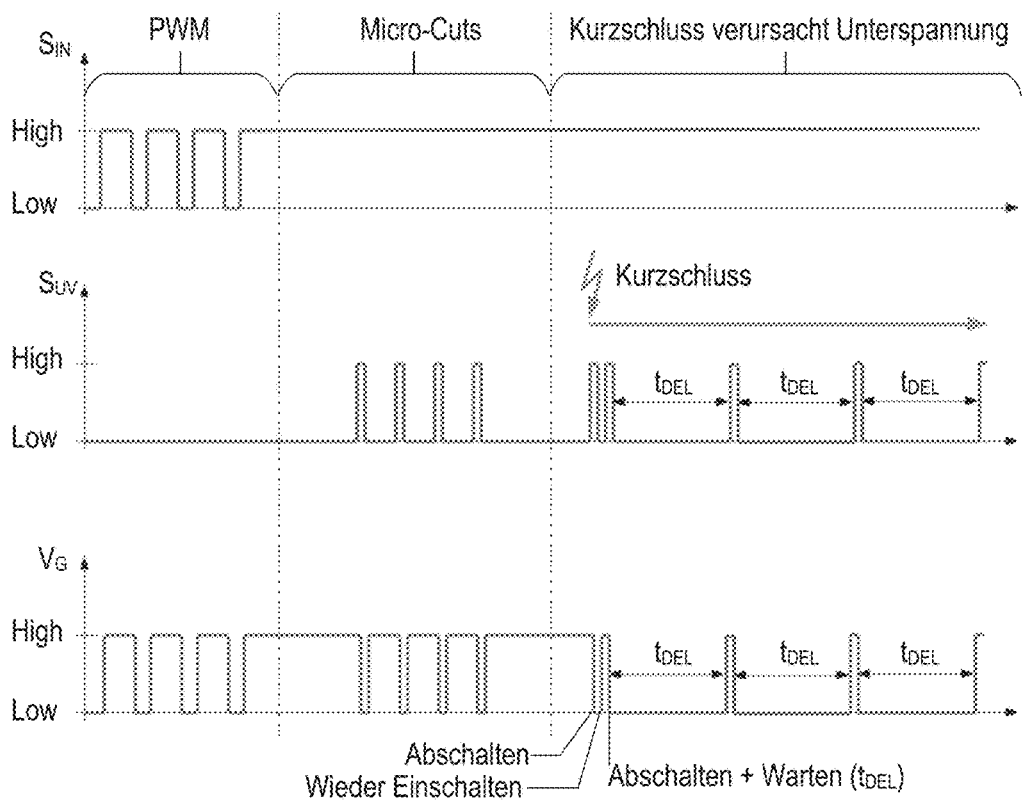
FIG. 3 illustrates the behavior of the intelligent semiconductor switch in the case of detecting an undervoltage condition in different situations (PWM operation, micro cuts, short circuit in the load).

The aforementioned delay time $t_{DEL}$ does indeed protect the transistor $T_S$ against overheating in the event of a short circuit but it is mostly undesirable in other situations. For this reason, in the exemplary embodiments described herein, the driver circuit is constructed in such a way that after an undervoltage shutdown, a delay time before switching on again is only incorporated if an undervoltage condition was detected previously during a switch-on process (i.e. during the rise time $t_R$, for example). One example of this concept is represented in FIG. 3. FIG. 3 illustrates in an exemplary manner—for different situations and using timing diagrams—the input signal $S_{IN}$, the undervoltage signal $S_{UV}$, which indicates an undervoltage condition, and the control signal of the switch element (gate voltage $V_G$ of the transistor $T_S$).

The timing diagrams from FIG. 3 sequentially show three different situations, namely (1.) a PWM operation of the electronic switch, (2.) random short interruptions in the supply voltage $V_S$, for example as a result of micro cuts, and (3.) a drop in the supply voltage caused by a short circuit. In the first situation (PWM operation, PWM=pulse width modulation), the control signal (the gate voltage Vo) of the transistor $T_S$ follows—as represented in FIG. 3—the input signal $S_{IN}$ without significant delay; the transistor $T_S$ is switched on and off according to the pulse width modulated input signal $S_{IN}$ ($S_{IN}$=Low signals "transistor off" and $S_{IN}$=High signals "transistor on"). In the second situation, the undervoltage signal $S_{UV}$ signals a plurality of short interruptions in the supply voltage $V_S$ (micro cuts), wherein the undervoltage signal $S_{UV}$ is a Boolean signal and in the present example, a high level ($S_{UV}$=high) indicates an undervoltage condition. In this situation, the transistor $T_S$ is switched off ($V_G$=Low) as soon as the signal $S_{UV}$ indicates an undervoltage condition and is switched on again ($V_G$=High) without delay if the signal $S_{UV}$ no longer indicates an undervoltage condition.

In the third situation, a short circuit is the cause of the undervoltage condition. As soon as the signal $S_{UV}$ indicates an undervoltage condition ($S_{UV}$=High), the transistor $T_S$ is switched off ($V_G$=Low). As mentioned, switching off the transistor $T_S$ also results in the load current $i_L$ being switched off and thus in a "recovery" of the supply voltage $V_S$. This means that the transistor $T_S$ is switched on again ($V_G$=High) immediately. However, in the event of a short circuit, an undervoltage condition will be detected again already during the switch-on process. Therefore, if a further undervoltage condition is detected during the switch-on process, the transistor is switched off again ($V_G$=Low) immediately and the transistor $T_S$ is prevented from switching back on again for a defined period of time (delay time $t_{DEL}$). This delay time $t_{DEL}$ is significantly longer than the typical fall time $t_F$ or the rise time $t_R$ in normal switching processes of a transistor.

Figure 4:
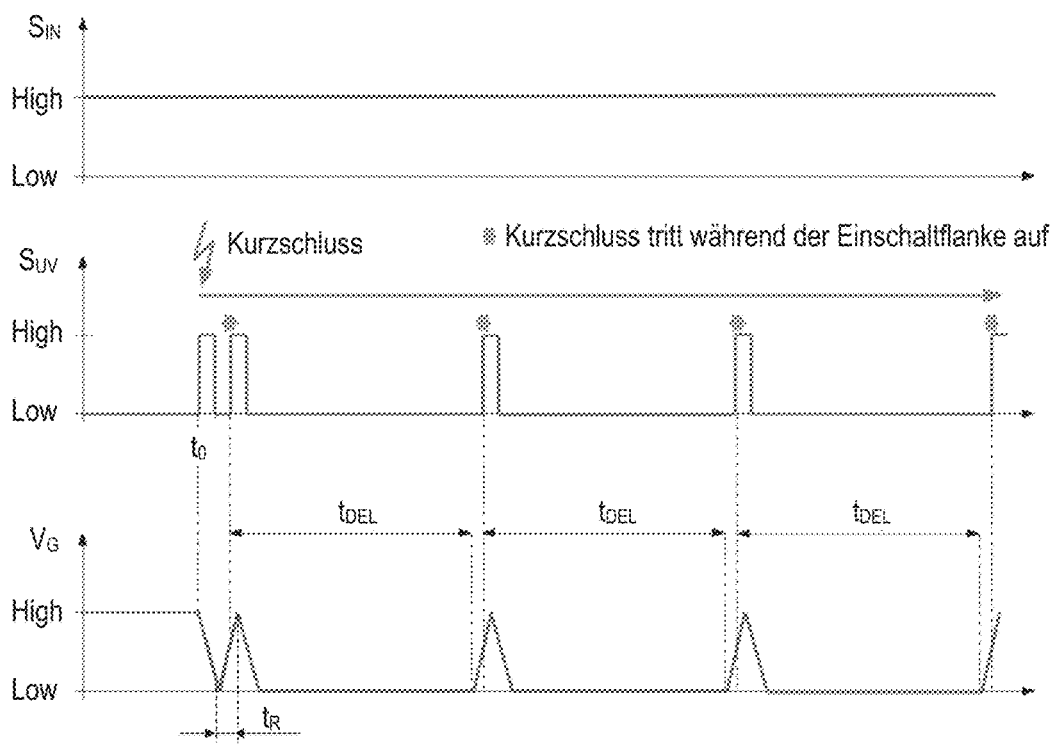
FIG. 4 illustrates the behavior of the intelligent semiconductor switch in the case of detecting an undervoltage condition in the case of a short circuit in the load.

As can be seen in FIG. 3, the delay time $t_{DEL}$ is only incorporated in a short circuit situation before switching the transistor on again. After an undervoltage shutdown as a result of a short interruption in the supply voltage $V_S$ or during PWM operation, a delay time $t_{DEL}$ before switching on the transistor $T_S$ is not incorporated. FIG. 4 shows the abovementioned third situation (short circuit causes undervoltage) in more detail, i.e. the timeline of the timing diagram is represented in a magnified manner in FIG. 4. In particular, FIG. 4 shows the course of the gate voltage $V_G$ in more detail. If a short circuit occurs (see FIG. 4, point in time $t_0$), the transistor $T_S$ is switched off, i.e. the gate of the transistor $T_S$ is discharged and the gate voltage $V_G$ drops to zero (relative to the source potential of the transistor $T_S$). By switching off the transistor, the undervoltage condition also ends and the transistor is switched on again. During the switch-on process, the gate of the transistor is charged and the gate voltage $V_G$ rises. This switch-on process lasts a specific time $t_R$ (rise time) which is dependent on various component parameters of the transistor and can also be influenced by the driver circuit 11. If an undervoltage condition is detected again during this switch-on process, —i.e. during the duration $t_R$ of the rising edge—the transistor $T_S$ is switched off again (as always, as a result of an undervoltage), but the transistor is prevented from switching on again for at least a period of time $t_{DEL}$.

Figure 5:
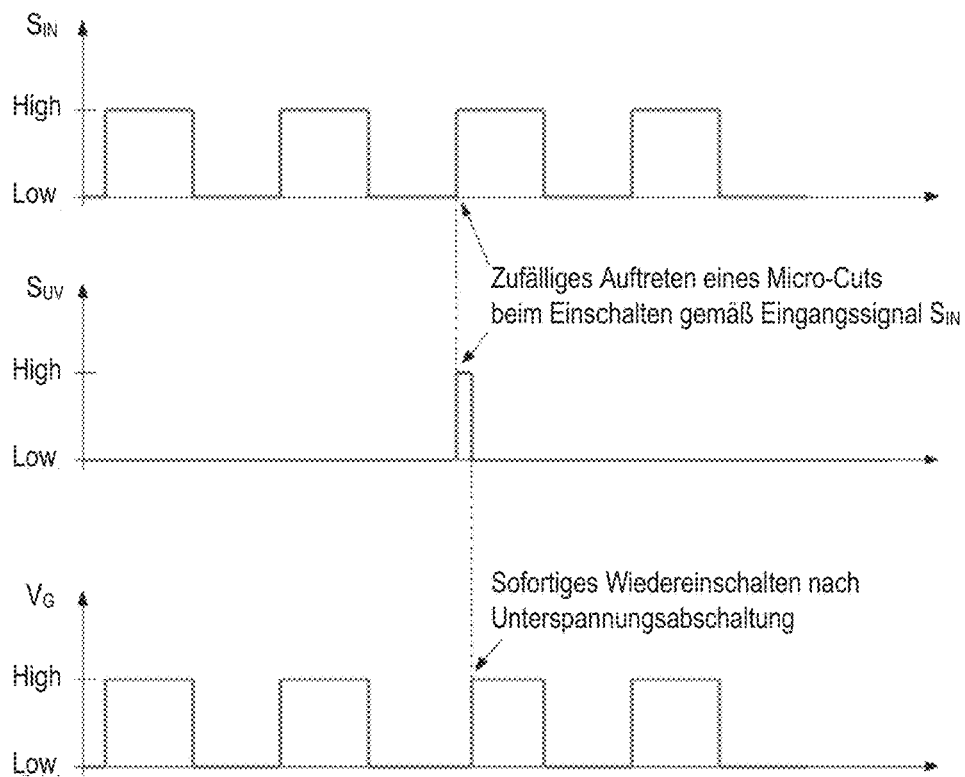
FIG. 5 illustrates the behavior of the intelligent semiconductor switch in the case of detecting an undervoltage condition during PWM operation.

FIG. 5 illustrates a further aspect which may be relevant in some applications. As mentioned, the electronic switch 10 (cf. FIG. 1) can also be used to control the load with a pulse width modulated (PWM) signal. In this case, the input signal $S_{IN}$ is pulse width modulated and the transistor $T_S$ is switched on and off corresponding to this signal. Now it is possible for a micro cut to occur randomly during a switch-on process, which, in the case of behavior according to the example from FIG. 4, would result in a delay in switching on again by a time $t_{DEL}$. However, a delay in switching on again can be undesirable during PWM operation, since a delay of this type would result in a distortion of the duty cycle of the pulse width modulation. In order to avoid a disruption in the PWM operation, provision can be made in some exemplary embodiments for a pause of the length $t_{DEL}$ to only be incorporated before the transistor is switched on again if—firstly—an undervoltage condition is detected during a switch-on process and the switch is consequently switched off again immediately and—secondly—the switch-on process was not triggered by a level change in the input signal $S_{IN}$. If a switch-on process is triggered by a level change in the input signal $S_{IN}$ and an undervoltage shutdown takes place randomly during the switch-on process, switching on again is not delayed.

Figure 6:
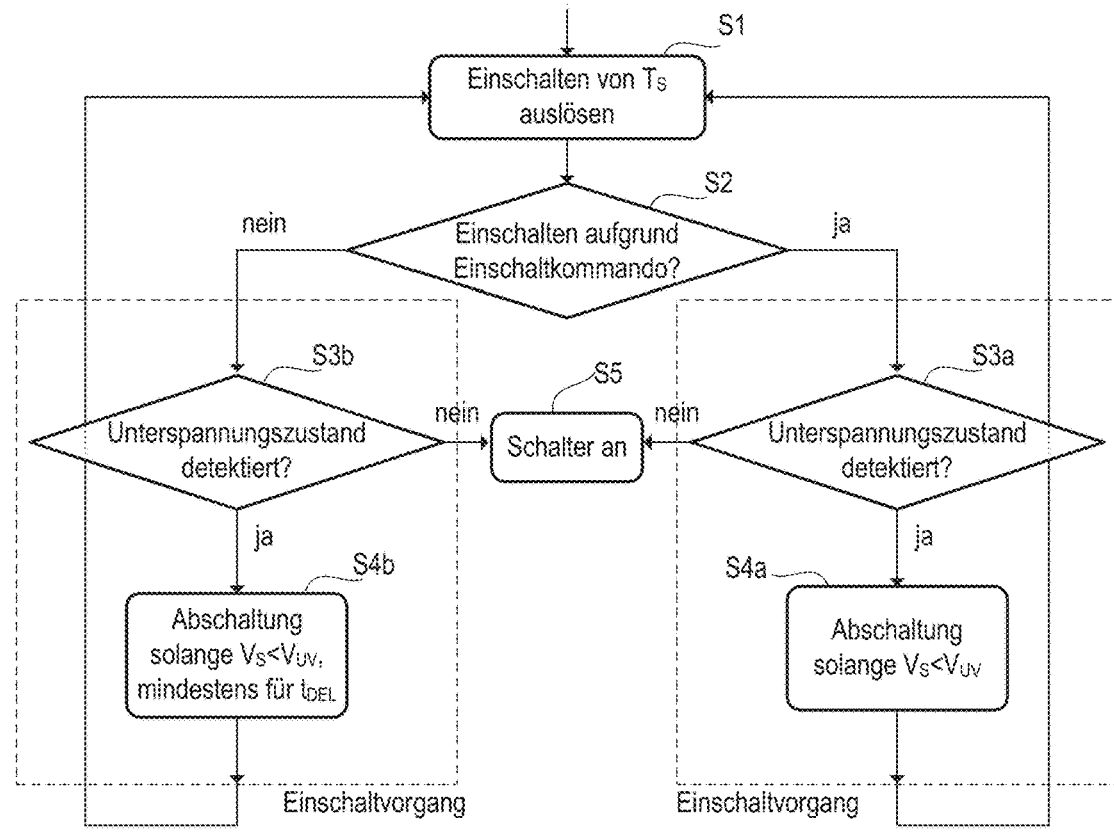
FIG. 6 illustrates an exemplary embodiment using a flow diagram.

The concept represented in FIG. 5 is represented in FIG. 6 as a flow diagram. The method according to FIG. 5 begins with triggering a switch-on process of the transistor $T_S$ (FIG. 6, S1). The further method is dependent on whether switching on was triggered by a switch-on command (level change in the input signal $S_{IN}$) or was triggered by a different event (e.g. elimination of an undervoltage condition) (FIG. 6, S2). In the first case (switching on as a result of a switch-on command), the transistor is switched off again (FIG. 6, S4a) if an undervoltage condition is detected during the switch-on process (FIG. 6, S3a). The transistor remains off for as long as the undervoltage condition exists ($V_S < V_{UV}$). If the undervoltage condition only lasts for a very short time (e.g. a few microseconds as a result of a micro cut), the transistor $T_S$ is switched on again immediately, i.e. without delay. In the second case (switching on as a result of a different event), the transistor is switched off again (FIG. 6, S4b) if an undervoltage condition is detected during the switch-on process (FIG. 6, S3b). The transistor remains off for as long as the undervoltage condition exists ($V_S < V_{UV}$), but at least for a period of time $t_{DEL}$ (e.g. a few milliseconds). In the case of a short circuit, the undervoltage condition will immediately be eliminated after the shutdown but switching on in the period of time $t_{DEL}$ is prevented. If (in both cases) an undervoltage condition is not detected during the switch-on process, the transistor is on after the switch-on process (FIG. 6, S5). It is understood that the case distinction S2 in FIG. 6 only relates to one possible exemplary embodiment (in particular if PWM operation is to be supported) and does not necessarily have to be implemented.

Figure 7:
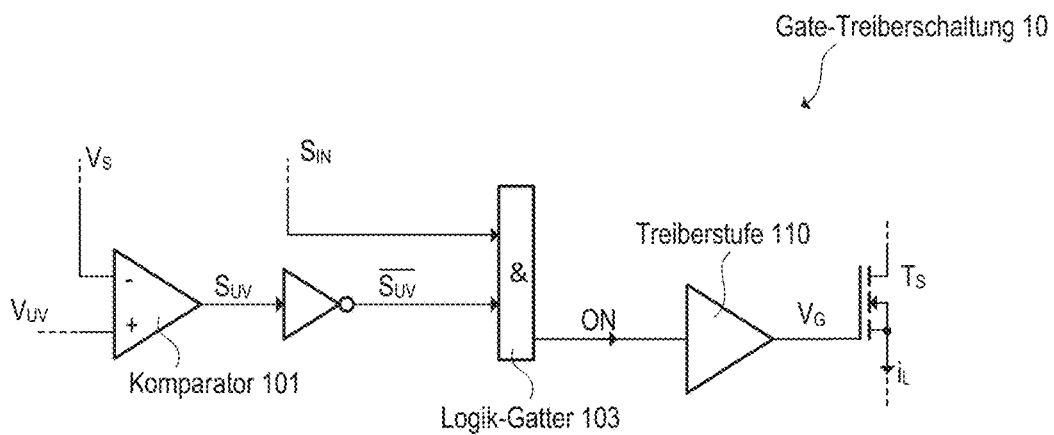
FIG. 7 illustrates one example of a gate driver circuit for an electronic switch.

Examples of possible implementations are explained hereinafter using simplified circuit diagrams. FIG. 7 is a simple example of a gate driver circuit 11 which switches the transistor $T_S$ on again immediately (without delay) after an undervoltage condition is eliminated. According to FIG. 7, the gate driver circuit 11 comprises a comparator 101 which is designed to compare the supply voltage $V_S$ which is applied to the supply voltage node $N_{SUP}$ with the threshold value $V_{UV}$. The output signal $S_{UV}$ of the comparator 101 is a logic signal which assumes a high level if the condition $V_S < V_{UV}$ is met. A low level of the signal $S_{UV}$ means that the supply voltage $V_S$ is above the threshold value $V_{UV}$. In other words: the signal $S_{UV}$ indicates an undervoltage condition and the undervoltage condition exists for as long as the signal $S_{UV}$ is at a high level. The logic gate 103 (AND gate) links the inverted comparator output signal $\overline{S_{UV}}$ with the input signal $S_{IN}$. In the example represented, the inverted comparator output signal $\overline{S_{UV}}$ is generated by the inverter 102 which is connected downstream of the comparator 101. The logic link $S_{IN}$ & $\overline{S_{UV}}$ delivers as a result the logic signal ON (output signal of the AND gate 103) which is supplied to a gate driver stage 110 which is designed to convert the logic signal ON into a corresponding gate voltage $V_G$. The gate voltage $V_G$ usually refers to the electrical potential of the source electrode of the transistor and is therefore in fact the gate source voltage. Using the example from FIG. 7, it is possible to see directly that the input signal $S_{IN}$ is blanked by means of the AND gate 103 in an undervoltage condition, which results in the transistor being switched off during an undervoltage condition. As soon as the undervoltage condition is eliminated, the transistor is switched on again immediately (without delay), provided that the input signal $S_{IN}$ still has a high level.

Figure 8:
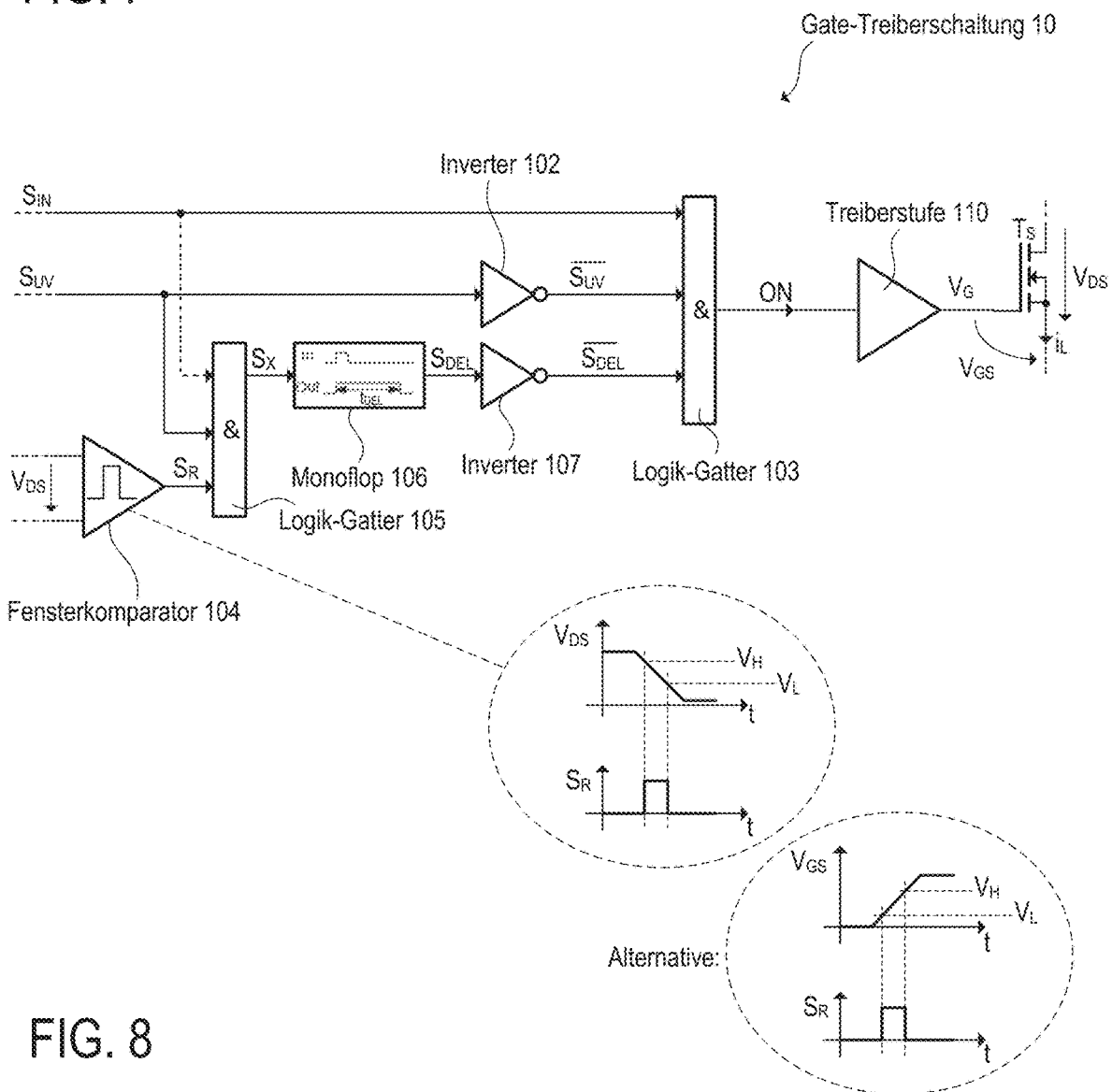
FIGS. 8-10 illustrate different exemplary embodiments of a gate driver circuit for an electronic switch.

As explained above with reference to FIGS. 3-6, a delay/pause $t_{DEL}$ before switching the transistor $T_S$ on again (after an undervoltage shutdown) should be incorporated in certain situations. One example of this is represented in FIG. 8, wherein the circuit from FIG. 8 can be regarded as an extension of the circuit from FIG. 7. For the sake of simplicity, the comparator 101 shown in FIG. 7 is omitted in FIG. 8 but is nevertheless present. According to FIG. 8, the AND gate 103 links not only the signals $S_{IN}$ and $\overline{S_{UV}}$ (as in FIG. 7) but additionally also the logic signal $S_{DEL}$ provided by the inverter 107. The signal ON is therefore the result of the link $S_{IN}$ & $\overline{S_{UV}}$ & $\overline{S_{DEL}}$. The signal $S_{DEL}$ signals the aforementioned delay/pause of the length $t_{DEL}$, i.e. that time interval in which the signal SN should remain blanked (and thus the transistor $T_S$ switched off), even if there is no undervoltage condition (any more). The signal $S_{DEL}$ signals the period of time $t_{DEL}$ by means of a high level; it is provided by a monostable multivibrator 106. The monostable multivibrator 106 is designed to generate the signal $S_{DEL}$ with a high level (pulse of the length $t_{DEL}$) as soon as it sees a high level or a rising edge of the signal $S_X$ at its input. The signal $S_X$ signals if an undervoltage condition occurs during a switch-on process of the transistor $T_S$. As explained above with reference to FIGS. 3 and 4, it is precisely in this situation that the pause of the length $t_{DEL}$ before switching on again should be incorporated.

The condition "during a switch-on process of the transistor" is detected in the example represented in FIG. 8 by means of the window comparator 104. The window comparator "sees" the voltage drop across the load current path of the transistor $T_S$ (i.e. the drain source voltage) at its input and generates an output signal $S_R$ which indicates with a high level when the voltage $V_{DS}$ is in the interval between $V_L$ and $V_H$. This means that the output signal $S_R$ of the window comparator 104 has a high level if and as long as the condition $V_L<V_{DS}<V_H$ is met. $V_L$ and $V_H$ refer to the threshold values of the window comparator 104; they are between a minimum drain source voltage $V_{DS,min}$ (some 100 mV) and the supply voltage $V_S$. When the transistor $T_S$ is switched on, the drain source voltage $V_{DS}$ drops from $V_S$ to $V_{DS,min}=i_L \cdot R_{ON}$ ($R^{ON}$ refers to the on resistance of the transistor $T_S$), whereby a short pulse is generated at the output of the window comparator as a signal $S_R$ (see timing diagram in FIG. 8), which pulse is supplied to an input of an AND gate 105. The AND gate 105 receives at further inputs the signal $S_{UV}$ (output signal of the comparator 101, see FIG. 7) and optionally the input signal $S_{IN}$. The output signal of the AND gate 105 is the above mentioned signal $S_X$ which is supplied to the monostable multivibrator 106. The signal $S_X$ indicates with a high level that an undervoltage condition ($S_{UV}$=high) occurs during a switch-on process ($S_R$=high). The additional AND link with the signal $S_{IN}$ (in the $S_{UV}$ & $S_R$ & $S_{IN}$ carried out by the AND gate 105) serves to ensure that the monostable multivibrator 106 cannot be triggered in the case of a low level input signal ($S_{IN}$=low).

Alternatively to the drain source voltage $V_{DS}$, the gate source voltage $V_{GS}$ can also be supplied to the window comparator. In this case, the window comparator 104 is designed in such a way that it outputs a high level if and as long as the condition $V_L<V_{GS}<V_H$ is met. In this case, the threshold values $V_L$ and $V_H$ are between 0V and a maximum gate voltage $V_{GS,max}$.

Figure 9:
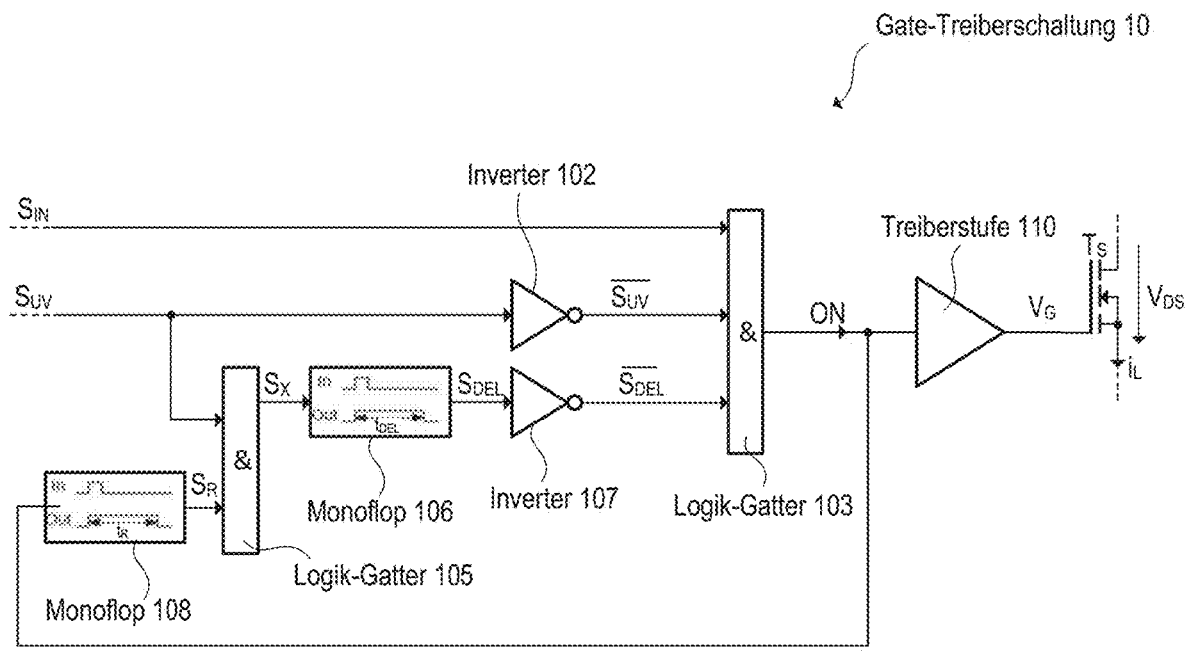

The example in FIG. 9 shows an alternative implementation to FIG. 9. The only difference between FIG. 8 and FIG. 9 is the manner in which the signal $S_R$ is generated, which indicates the switch-on process. Instead of the window comparator 104, a further monostable multivibrator 108 is provided to which the signal ON is supplied and which generates a pulse of the length $t_R$ as a signal $S_R$ in response to a rising edge of the signal ON. The time $t_R$ essentially corresponds to the switch-on time of the transistor $T_S$ which is a priori known and substantially constant and is dependent on known component parameters.

Figure 10:
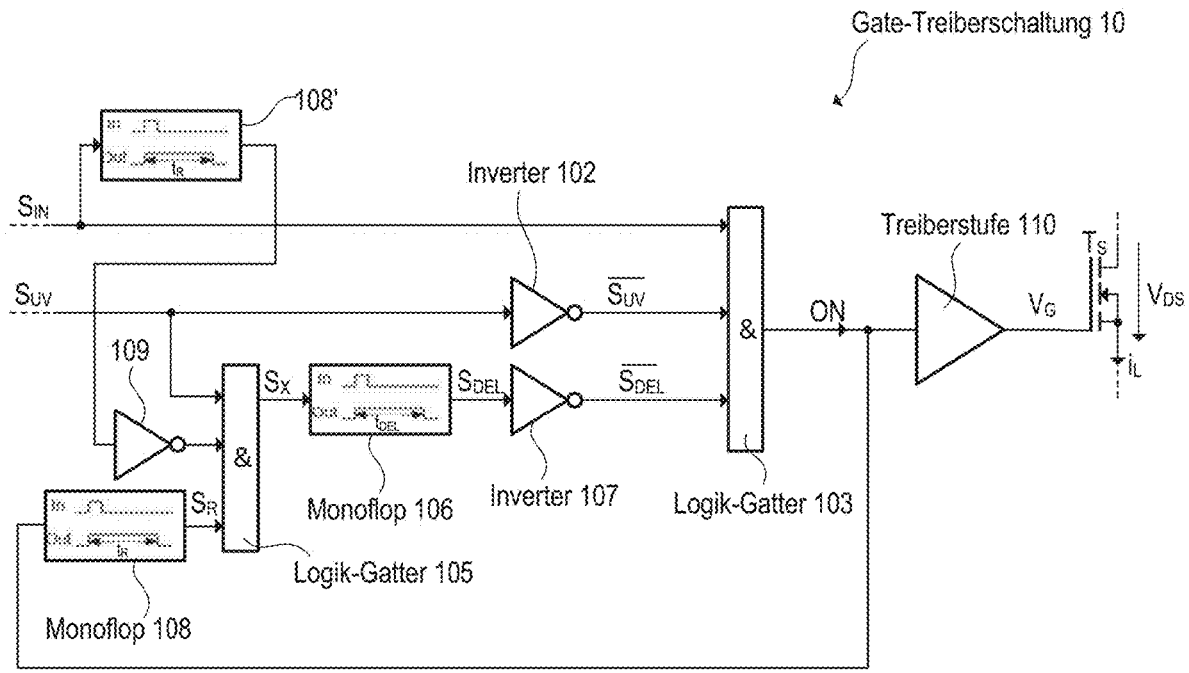

The example from FIG. 10 relates to an extension of the example from FIG. 9. The extension has already been explained with reference to the flow diagram from FIG. 6. In comparison to FIG. 9, the example from FIG. 10 additionally includes the monostable multivibrator 108' and the inverter 109 which is connected downstream of the monostable multivibrator 108', the output of which inverter is supplied to a third input of the AND gate 105. The input signal $S_{IN}$ is supplied to the monostable multivibrator 108'. This means that the monostable multivibrator 108' "sees" a switch-on command (level change from low to high) transmitted by the signal $S_{IN}$ and, in response to this, generates a pulse with a pulse length of $t_R$, for example (the same as or longer than the pulse generated by the monostable multivibrator 108). This pulse is inverted and the inverted signal is supplied to the AND gate 105. The switch-on command thus prevents the monostable multivibrator 106 from being triggered and consequently the pause $t_{DEL}$ from being incorporated, as is represented in the timing diagram from FIG. 5.

It is understood that the function of the circuits from FIGS. 7-10 can be implemented in various ways. The circuits from FIGS. 7-10 are therefore merely to be understood as examples. For example, the AND gates can be replaced by NOR gates if inverted input signals are used. In general, logic levels can be inverted if the circuit is modified accordingly. In other exemplary implementations, an undervoltage condition can be signaled by a low level of the signal $S_{UV}$ instead of by a high level, for example. The levels of other logic signals can be inverted in the same manner. The aforementioned modifications are essentially decisions which must be made by a person skilled in the art during circuit design. The basic function of the circuit is not dependent on this.

Moreover, it is understood that the functions described herein may also be provided by a processor which is designed to execute software instructions. A combination of software (firmware) that must be executed by a processor and hard-wired logic circuitry is also possible. An implementation as a hard-wired logic circuit without a processor is also possible. In this case, the functions described herein are provided by a finite state machine, for example. This can be realized in an FPGA (Field Programmable Gate Array) or also as an ASIC (Application Specific Integrated Circuit), for example.

The invention claimed is:

1. A method for operating an electronic switch, the method comprising:
    detecting whether there is an undervoltage condition at a supply voltage node and providing an undervoltage signal which indicates the undervoltage condition;
    switching off the electronic switch if the undervoltage signal indicates the undervoltage condition; and
    switching on the electronic switch if the undervoltage signal no longer indicates the undervoltage condition;
    wherein if the undervoltage signal indicates the undervoltage condition during a switch-on process of the electronic switch, the electronic switch is switched off again and is prevented from switching back on for a defined period of time, irrespective of the undervoltage signal, and
    wherein after the electronic switch is switched off as a result of the undervoltage condition which did not occur during a switch-on process of the electronic switch, the electronic switch is switched on again immediately as soon as the undervoltage signal no longer indicates the undervoltage condition.

2. The method according to claim 1,
    wherein the defined period of time of the switch-on process is detected by a window comparator which indicates if a voltage drop across the electronic switch is within a defined voltage range.

3. The method according to claim 1,
wherein the defined period of time of the switch-on process is set as a defined time interval which follows a point in time at which the electronic switch is conductively controlled.

4. The method according to claim 1,
wherein the electronic switch is switched on directly and without delay if at least the defined period of time has passed since a previous switch-on process or if the undervoltage signal did not indicate an undervoltage condition in the previous switch-on process.

5. The method according to claim 1, the method further comprising:
detecting a short circuit if the undervoltage signal indicates the undervoltage condition during the switch-on process of the electronic switch and the switch-on process does not take place in response to a switch-on command.

6. The method according to claim 5, which, in response to detecting the short circuit, further includes:
signaling the short circuit and/or permanently switching off the electronic switch until a subsequent switch-on command is received.

7. A circuit for controlling an electronic switch, the circuit comprising:
a comparator circuit configured to detect whether there is an undervoltage condition at a supply voltage node and to generate an undervoltage signal which indicates the undervoltage condition;
a detector circuit configured to detect and to indicate a period of time of a switch-on process of the electronic switch, and
a logic circuit configured to detect whether the undervoltage signal indicates the undervoltage condition during the switch-on process, and to generate a control signal for the electronic switch, wherein the control signal signals the electronic switch switching off if the undervoltage signal indicates the undervoltage condition, and the control signal signals the electronic switch switching on if the undervoltage signal no longer indicates the undervoltage condition,
wherein switching back on is prevented for a defined period of time if the undervoltage signal indicates the undervoltage condition during the switch-on process,
and wherein the logic circuit is further configured to generate a further control signal for switching on the electronic switch in response to a switch-on command, wherein in an event that the undervoltage condition is detected during a subsequent switch-on process and the electronic switch is switched off again, switching back on is not delayed.

8. The circuit according to claim 7,
wherein the detector circuit includes a window comparator configured to detect whether a voltage drop across the electronic switch is within a defined voltage range.

9. The circuit according to claim 7,
wherein the detector circuit includes a window comparator configured to detect whether a control voltage of the electronic switch is within a defined voltage range.

10. The circuit according to claim 7,
wherein the detector circuit is configured to signal a defined time interval since a point in time at which the control signal indicates the electronic switch switching on.

11. A method for operating an electronic switch, the method comprising:
detecting whether there is an undervoltage condition at a supply voltage node and providing an undervoltage signal which indicates the undervoltage condition;
switching off the electronic switch if the undervoltage signal indicates the undervoltage condition;
switching on the electronic switch if the undervoltage signal no longer indicates the undervoltage condition;
wherein if the undervoltage signal indicates the undervoltage condition during a switch-on process of the electronic switch, the electronic switch is switched off again and is prevented from switching back on for a defined period of time, irrespective of the undervoltage signal; and
switching on the electronic switch in response to a switch-on command, wherein in an event of the electronic switch being switched off during the switch-on process as a result of the undervoltage condition indicated by the undervoltage signal, switching back on is not delayed.

12. A circuit for controlling an electronic switch, the circuit comprising:
a comparator circuit configured to detect whether there is an undervoltage condition at a supply voltage node and to generate an undervoltage signal which indicates the undervoltage condition;
a detector circuit configured to detect and to indicate a period of time of a switch-on process of the electronic switch, and
a logic circuit configured to detect whether the undervoltage signal indicates the undervoltage condition during the switch-on process, and to generate a control signal for the electronic switch, wherein the control signal signals the electronic switch switching off if the undervoltage signal indicates the undervoltage condition, and the control signal signals the electronic switch switching on if the undervoltage signal no longer indicates the undervoltage condition,
wherein switching back on is prevented for a defined period of time if the undervoltage signal indicates the undervoltage condition during the switch-on process, and
wherein the logic circuit is further configured to generate a further control signal for switching on the electronic switch directly and without delay if at least the defined period of time has passed since a previous switch-on process or if the undervoltage signal did not indicate the undervoltage condition in the previous switch-on process.

* * * * *